July 4, 1944.  K. R. KARLSON  2,352,899

SEALING HEAD AND MACHINE

Filed May 26, 1941  2 Sheets-Sheet 1

Inventor

Karl R. Karlson,

Attorney

July 4, 1944.   K. R. KARLSON   2,352,899
SEALING HEAD AND MACHINE
Filed May 26, 1941   2 Sheets-Sheet 2

Inventor
Karl R. Karlson,
By Ross C. Hurney
Attorney

Patented July 4, 1944

2,352,899

UNITED STATES PATENT OFFICE 2,352,899

SEALING HEAD AND MACHINE

Karl R. Karlson, Montclair, N. J., assignor to Union Bag & Paper Corporation, New York, N. Y., a corporation of New Jersey Application May 26, 1941, Serial No. 395,307

4 Claims. (Cl. 226—56)

It has heretofore been proposed, in forming a heat seal between plies which may have an irregular conformation, to make one of the pressure members yieldable so as to conform to the variations of thickness or configuration of the material being sealed. Such proposals have included the provision of a backing bar made of rubber or equivalent material. Such arrangements are entirely satisfactory where a substantial pressure per unit area can be attained. Where, however, the pressure per unit of area is seriously limited, such expedients fail for the reason that the modulus of elasticity of the backing member is so great that the limited pressure will not produce a sufficient deformation of the member to permit it accurately to conform to the configuration of the surface.

I have devised a sealing head which is yieldable, in all dimensions, under relatively low pressures so that perfect conformation can be attained and which, at the same time, is capable of presenting a heated surface to the parts to be sealed. This head has particular utility in connection with the bag and sealing process disclosed in my copending applications filed of even date herewith, Serial No. 395,306, and Serial No. 395,308.

My copending applications aforesaid disclose a bag having an automatic type bottom in which there has been inserted between the several plies thermoplastic material which, due to the bag construction, cannot be activated to form a seal until after the bag is opened. The bag is opened and filled and is placed in a form to give it lateral support, and is then pressed downwardly upon a heated surface. This serves to activate the thermoplastic material in the bottom plies, causing such material to soften and flow so as to form a perfect and integral seal. It is clear that in such a process, the amount of pressure which can be applied to the bag is rather abruptly limited. Such bags will usually be filled with granular material and, when external mechanical pressure is applied, this material has a semi-hydrostatic effect and will tend to strain the walls of the bag, particularly the longitudinal seam. This tendency is overcome to some extent by providing lateral support for the bag walls during the pressing operation. It is, however, obvious that a perfect fit between the external supporting member and the entire periphery of the bag cannot be assured in all cases and reasonable prudence, therefore, dictates a limit to the applied pressure as a measure of safety. It is also evident that, with several inches of insulating material intervening between the pressure member acting at the top of the bag and the backing member which supports the bottom of the bag, heat must be transmitted entirely from the bottom.

Due to the nature of the automatic type of bag bottom, there will be superimposed various numbers of plies and therefore, under pressure, the surface of the bag bottom will be irregular in configuration.

I have met the problem by providing a body capable of being heated and of emitting heat, and of deforming mechanically under relatively light pressures per unit of area. This will be more particularly described in the following specification taken in conjunction with the annexed drawings in which.

It will be understood that the amount of deformation of the sealing head in order to accommodate itself to variations in the configuration of the bag bottom will be relatively slight, that is, assuming paper 0.001" thick, the difference between two plies and six plies is a matter only of 0.004". It is essential, however, that the sealing head be capable of deforming to the maximum extent necessary under the maximum loads per unit of area which may be permissible. At the same time it is essential that the deformation of the material under such loads be not so great as to permit undue downward translation of the package under the applied load. These conditions may be met by resort to the principle of hydrostatic pressure. This principle may be generalized by stating that under hydrostatic conditions all points in the same horizontal plane are subject to the same hydrostatic pressure, and that the application of external pressure on any portion of a hydrostatic body will result in the application of an identical pressure to every other portion of that body lying in the plane of application of the external pressure. In hydrostatic bodies having relatively small vertical depth, the mathematical assumption that pressure is equal through the body and is equal against all bounding surfaces of the container of the body is entirely warranted.

In a body of liquid, for the purpose of ordinary hydrostatic computation, friction between particles or molecules may be disregarded. In the case of a body formed of a multitude of small solid particles, such as comminuted iron or aluminum, the hydrostatic principle of pressure dispersion still applies, but the friction between particles being far more pronounced, the hydrostatic effect is modified in degree. Where, however, the actual and absolute deformation is small, a departure in the behavior of a body of granular solids as against the behavior of a body of liquid is far less pronounced, and with the small amplitude of deformation encountered in the problem solved by this invention, the difference may be regarded as negligible.

Figure 1:
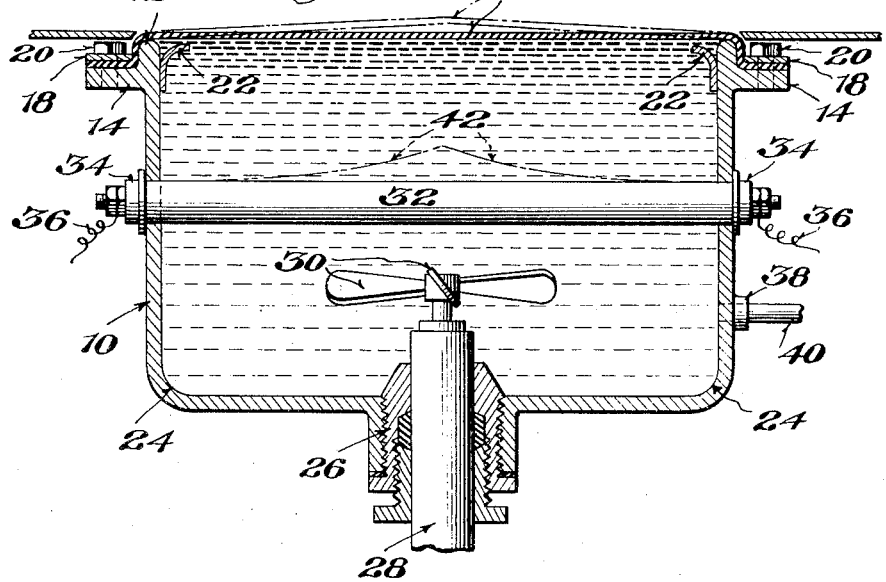
Figure 1 is a section through one form of my improved sealing head.

In Fig. 1 I provide a container 10 having an open side 12 around the periphery of which is a flange 14. A film or diaphragm 16 is stretched across the open end 12 and is held in place by a ring 18 and cap screws 20. Below the diaphragm 16 and secured by welding or otherwise to the container 10 is a peripheral flange 22, the function of which will be discussed hereinafter. The bottom of the container 10 is curved as indicated at 24 for cooperation with the flange 22.

Centrally of the bottom of the container 10 is a stuffing box 26 through which passes a shaft 28 carrying at its end inside the container 10 an impeller 30. Mounted transversely of the container 10 is an electric heating element 32 which emerges through stuffing boxes 34 to the exterior of the container 10 and is fed with current by means of connections 36.

A tap 38 connects a feed line 40 with the interior of the container 10. The container is kept absolutely full of a suitable liquid such as mercury or any of the special high-boiling point liquids, such, for example, as the liquid sold under the trade-name "Dowtherm," and a constant hydrostatic pressure is maintained through a suitable control device (not shown) which connects with the interior of the container 10 by means of the pipe line 40. Such a control device may be of any of a number of conventional forms involving, usually, the principle of a constant pressure expansion chamber, with, if desired, a device in the nature of a safety valve. Such devices are conventional and the details thereof form no part of the present invention. This is important, since it provides means for limiting the hydrostatic pressure to avoid overstressing the diaphragm, and permits a building up of pressure to meet the bag load without depending on depression of the whole area of the bag bottom to create the pressure. The line 40 is connected to a plunger pump, not shown, which is synchronized with the pressure head shown in Figs. 3 and 4 and acts to build up a balanced hydrostatic pressure while the bag is pressed downward, and to relieve the pressure as the bag is released.

The impeller 30 is so formed that upon rotation it tends to draw the liquid downwardly toward the bottom of the container 10. The liquid is then deflected upwardly by the curved walls 24 and, on approaching the upper part of the container, is deflected laterally and inwardly by the curved flange 22.

The heating element 32 has a differential winding which produces a temperature gradient having its maximum at the center of the element 32 and its minimum adjacent each end thereof. This gradient is represented by the dotted lines 42 in Fig. 1.

In the absence of the impeller, convection currents would be formed arising from the heating element 32. The impeller sets up mechanical currents which oppose the formation of convection currents and result in the distribution over the entire surface of the diaphragm 16 of uniformly heated liquid.

The diaphragm 16 may be formed of any of a variety of materials which must, however, be capable of transmitting and emitting heat; of having a relatively low modulus of elasticity, and of having a relatively high elastic limit. The modulus of elasticity must, however, be sufficiently high to prevent undue yielding of the diaphragm under the pressure of the bag resting upon it. This problem is actually less complicated than might appear to be the case since the requisite deformation must occur vertically, that is, out of the horizontal plane, and this deformation, as previously stated, is relatively slight. Mathematically, therefore, the lineal extension of any transverse element of the diaphragm under a relatively slight vertical deflection will be extremely small, and no very great tension load will, therefore, be imposed upon the diaphragm. Since, however, the container is absolutely full of liquid, the downward displacement of any portion of the diaphragm in contact with the bag must be compensated for by an upward displacement of the remainder of the diaphragm. The upward displacement will also be relatively slight. The resultant of both the downward and upward deflection of any particular transverse element of the diaphragm may, however, produce a localized stretch in the diaphragm and may therefore, at the localized area, result in a considerable strain.

Under hydrostatic principles, if the pressure applied to the bag and therefore by the bag to the diaphragm is equal, say, to fifty pounds per square inch, then the pressure exerted by the liquid upon that portion of the diaphragm which is not in contact with the bag bottom will also be fifty pounds per square inch. So far as tensional stress on the material of the diaphragm is concerned, over the area covered by the bag bottom, there will be tension stressing occasioned only by the differential deflections required to bring about conformation with the bag body. The downward pressure of the bag will be completely balanced by the upward pressure of the liquid. Where, however, the diaphragm is not covered by the bag bottom and is subject to the hydrostatic pressure, there will be an upward deflection of the surface of the diaphragm which will be limited only by the modulus of elasticity of the diaphragm and its thickness. It may therefore be desirable to make the diaphragm of additional thickness over that portion of its area which will not normally be in contact with the bag bottom, and in any event the elastic limit of the material of the diaphragm must be sufficiently high so that a permanent set will not occur under whatever strain or deflection shall, by the design of the diaphragm, be permitted. The gross deflection will be limited by the total applied pressure and the modulus of elasticity of the material, and, as previously postulated, the gross applied load is limited to perfectly workable proportions. Examples of suitable materials for use in the diaphragm are goldbeaters skin, and those products known by the trade names "Vinylite" and "Koroseal."

Figure 2:
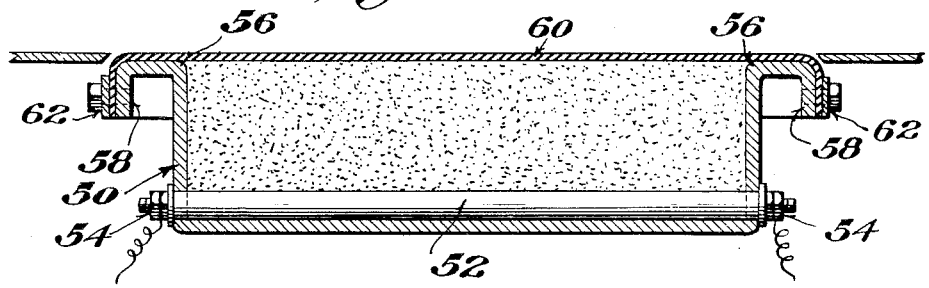
Fig. 2 is a section through a different form of my improved sealing head.

In Fig. 2 I illustrate the principle of my sealing head where a body of comminuted solids is used instead of a body of liquid. Here I provide a container 50 having, over its entire bottom, a heating element 52 supplied with current by wires 54.

The container has an upper open side 56 around which is a flange 58. Across the open end is stretched a diaphragm 60 secured in place by a clamping ring 62 which clamps the diaphragm 60 against the flange 58.

In this case there is no possibility of convection currents and therefore agitation of the comminuted solid, which will entirely fill the space between the heating element 52 and the diaphragm 60, is omitted. The diaphragm 60 may be of the same material as the diaphragm used with the liquids. It may, however, consist merely of a finely woven metallic screen having a mesh sufficiently fine to prevent sifting through of the comminuted solid. When a filled bag is pressed down on the diaphragm 60, the comminuted metal or other heat transmitting material in the container 50 will shift and accommodate itself to the configuration of the bag bottom. This accommodation may be slightly less effective than is the case where a body of liquid is used. In practice, however, it will be found to be very nearly as effective since any given head will usually receive bags which are all of the same type and size and therefore the major variations in configuration will impress themselves upon the body of comminuted solids and will form the surface of this body into a relatively permanent bas-relief of the bag bottom. The minor variations between individual bags may thereafter be easily compensated for by extremely minor shifts of the particles of the comminuted material.

Figure 3:
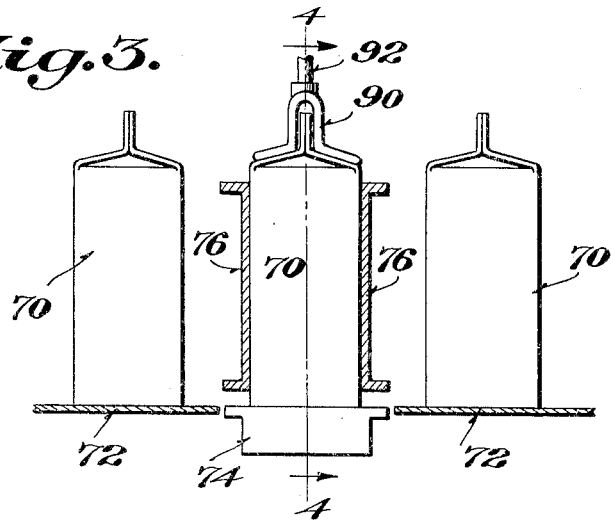
Fig. 3 is a longitudinal section through a schematic representation of a machine in which my improved head may be used.
Figure 4:
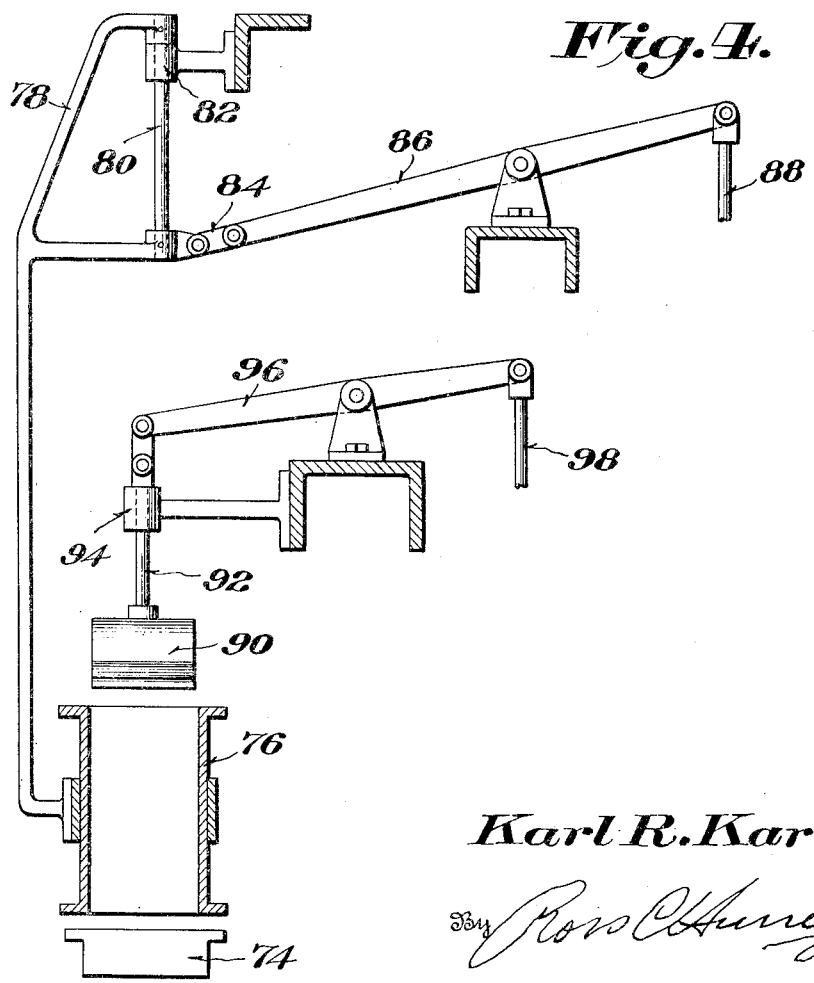
Fig. 4 is a section on the line 4—4 of Fig. 3 with operating parts added thereto.

In Figs. 3 and 4 I have illustrated schematically a type of bag sealing machine in which my improved head may be used. A series of bags 70 is fed along a table 72, a portion of which is broken away to make room for my improved sealing head 74. When a bag arrives in a position of rest on the head 74, a supporting frame 76 descends and completely surrounds the vertical walls of the bag. A bracket 78 is guided on a rod 80 which is clamped by a fixed member 82. One end of the bracket 78 connects through an elongated slot 84 with one end of a bell-crank 86, the other end of which is oscillated by a link 88 driven from a cam shaft (not shown).

When the frame 76 has surrounded the bag 70, a pressure member 90 descends and thrusts the bag against the active surface of the head 74. The head 90 is actuated by means of a rod 92 running through a fixed bearing 94. Reciprocation of the head 90 is accomplished by means of a bell-crank 96 oscillated by a link 98 which in turn is driven by a cam (not shown). The cams driving the links 88 and 98 are so timed that the pressure member descends at once after the descent of the frame 76. A dwell in the cam driving the link 88 permits the frame 76 to remain in position during the operation of the pressing member 90, and both cams are arranged so that on the conclusion of the pressing operation, both the head 90 and the frame 76 are vertically withdrawn to free the bag and permit its removal and replacement with a new bag.

The cam which operates the head 90 or a cam mounted on the same shaft, or on a shaft synchronized therewith, may be used to actuate a plunger pump in the line 40 for the purposes hereinabove set forth. Such mechanical details are matters for the skill of a mechanic and form no part of the present invention.

I do not intend to be confined to any particular shape and proportion of parts nor to the use of any particular materials.

What is claimed is:

1. A sealing head comprising a quantity of powdered metal; a container therefor having one side open; a sheet of wire mesh of such fineness as not to permit passage of said powdered metal, said sheet being in contact with said metal and being secured around the opening in said container; and means for heating said metal.

2. A filled bag sealing machine comprising downwardly movable means for exerting pressure on the upper end of a filled bag; means affording lateral support to the walls of the bag during the operation of said pressure exerting means said lateral supporting means being movable from inoperative position to operative position in advance of the operation of said pressure exerting means; means supporting the bottom of the bag against such pressure; and means for heating said supporting means.

3. A filled bag sealing machine comprising downwardly movable means for exerting pressure on the upper end of a filled bag; means affording lateral support to the walls of the bag during the operation of said pressure exerting means said lateral supporting means being movable from inoperative position to operative position in advance of the operation of said pressure exerting means; means supporting the bottom of the bag against such pressure; and means for heating said supporting means, the surface of said supporting means being yieldable to conform to the configuration of the bag bottom.

4. A filled bag sealing machine comprising: a sealing head for supporting the bottom of a filled bag; a member above said sealing head and adapted to contact the upper end of a supported bag; means for causing said member and said supporting means to approach each other to exert pressure on a filled bag; said sealing head including a quantity of powdered metal; a container therefor having one side open; a sheet of wire mesh of such fineness as not to permit passage of said powdered metal, said sheet being in contact with said metal and being secured around the opening in said container and forming the bag supporting surface of said sealing head; and means for heating said metal.

KARL R. KARLSON.